A. A. MEANS.
FLY TRAP.
APPLICATION FILED FEB. 23, 1911.

995,886.

Patented June 20, 1911.

Witnesses

Inventor
A. A. Means
By
Attorney

UNITED STATES PATENT OFFICE.

ANNIE A. MEANS, OF YATESVILLE, GEORGIA.

FLY-TRAP.

995,886.  Specification of Letters Patent.  Patented June 20, 1911.

Application filed February 23, 1911. Serial No. 610,440.

*To all whom it may concern:*

Be it known that I, ANNIE A. MEANS, a citizen of the United States, residing at Yatesville, in the county of Upson and State of Georgia, have invented certain new and useful Improvements in Fly-Traps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fly catching devices and consists of various details of construction and combinations and arrangements of parts which will be hereinafter fully described and then specifically defined in the appended claims.

I illustrate my invention in the accompanying drawings, in which:—

Figure 1:
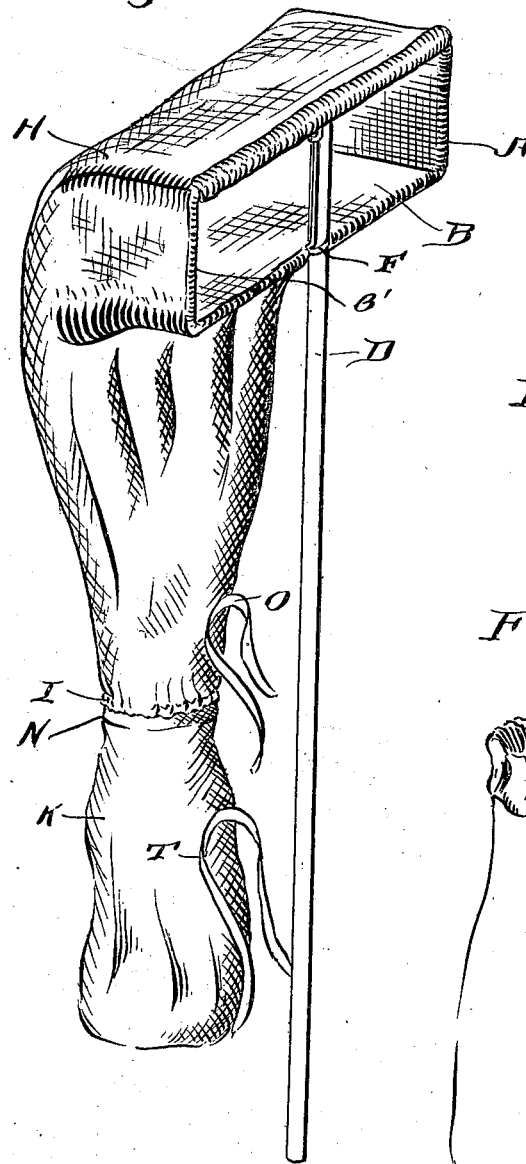
Figure 2:
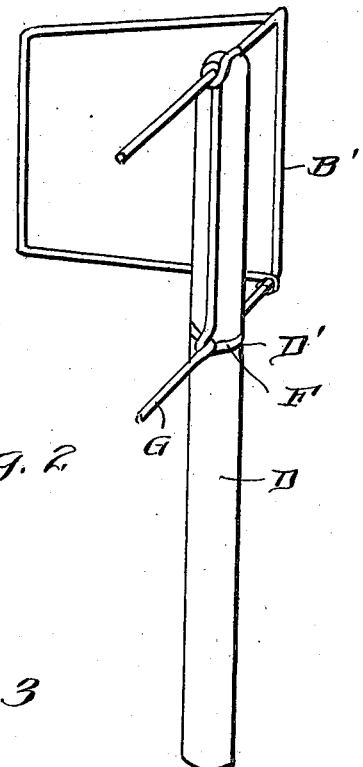
Figure 3:
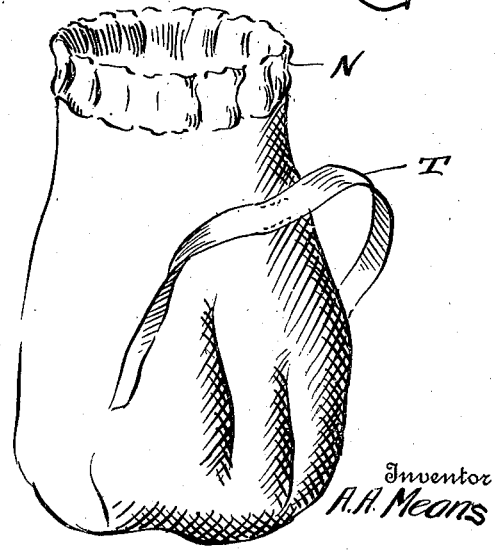

Figure 1 is a perspective view of the device. Fig. 2 is a vertical sectional view, and Fig. 3 is a detail view of a sack attachment.

Reference now being had to the details of the drawings by letter, A designates a skeleton frame which is provided with an opening B and side pieces B', a handle D being fastened at D' to the marginal edge of the frame and also to an eye F formed in the wire G which forms the skeleton frame, portions of said wire being twisted about the parallel strands forming the marginal edge of the opening B and thence extending parallel with the handle and one on each side. A netting H is fastened to the skeleton frame and one end has an elastic cord I formed about its contracted end. Fastened to the circumference of the netting is a cord or tie strap O.

A bag, designated by letter K, has a ring N fastened to its upper contracted end and is circumferentially grooved and adapted to receive the elastic cord I, forming means whereby the bag may be attached to the netting when it is desired to empty the insects caught by the netting into said bag. Cords T are fastened to the bag and form means whereby the top may be closed after the insects have been emptied therein.

From the foregoing, it will be noted that, by the provision of a fly catching device as shown and described, a simple and efficient means is afforded whereby insects of various kinds may be caught within the netting and, by opening communication between the same and the bag, transferred to the latter and, when therein, the cords T may be drawn about the bag and tied, thus confining the same after which the bag may be removed and the insects destroyed.

What I claim to be new is:—

1. A fly catching device comprising a skeleton frame having a rectangular outlined marginal edge forming the opening thereto and made of a single piece of wire, a handle, said wire being bent about the handle and having a standard engaging the end of the handle with a portion of the wire connecting the two opposite edges of the wire forming the marginal edge of the opening to the trap, a netting secured to said wire and having a contracted exit end, and a receptacle connected thereto.

2. A fly catching device comprising a skeleton frame having a rectangular outlined marginal edge forming the opening thereto and made of a single piece of wire, a handle, said wire being bent about the handle and having a standard engaging the end of the handle with a portion of the wire connecting the two opposite edges of the wire forming the marginal edge of the opening to the trap, a netting secured to said wire and having a contracted exit end with an elastic material about the marginal edge thereof, a receptacle with one end open, and a grooved ring fitted therein and adapted to be engaged by said elastic band.

In testimony whereof I hereunto affix my signature in the presence of two witnesses.

ANNIE A. MEANS.

Witnesses:
JOHN T. MEANS,
PAUL MEANS.

Copies of this patent may be obtained for five cents each, by addressing the "Commissioner of Patents, Washington, D. C."